(12) United States Patent
Jiang

(10) Patent No.: US 9,756,154 B1
(45) Date of Patent: Sep. 5, 2017

(54) HIGH THROUGHPUT PACKET STATE PROCESSING

(71) Applicant: Xilinx, Inc., San Jose, CA (US)

(72) Inventor: Weirong Jiang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 418 days.

(21) Appl. No.: 14/512,766

(22) Filed: Oct. 13, 2014

(51) Int. Cl.
*H04L 29/08* (2006.01)
*H04L 29/06* (2006.01)

(52) U.S. Cl.
CPC ............ *H04L 69/324* (2013.01); *H04L 69/22* (2013.01)

(58) Field of Classification Search
None
See application file for complete search history.

(56) References Cited

U.S. PATENT DOCUMENTS

| 2003/0226085 A1* | 12/2003 | Tucker | H03M 13/09 714/752 |
| 2007/0047572 A1* | 3/2007 | Desai | H04L 47/10 370/463 |
| 2009/0257451 A1* | 10/2009 | Saghi | G06F 13/385 370/476 |

* cited by examiner

*Primary Examiner* — Faruk Hamza
*Assistant Examiner* — Cassandra Decker
(74) *Attorney, Agent, or Firm* — Gerald Chan; David O'Brien

(57) ABSTRACT

A system for processing data includes a filtering module having a plurality of processing units, a state accumulator, and a merging network coupled to the processing units and the state accumulator. Each processing unit is configured to output a set of two sub-state vectors and a packet continuance indicator. The state accumulator is configured to store a state resulted from previous processing cycles by the processing units. The merging network is configured to output a master state vector based at least in part on the set of two sub-state vectors, the stored state, and the packet continuance indicators output from the processing units.

20 Claims, 11 Drawing Sheets

300a INPUT

| LANES | | START OF PACKET (SOP) 204 | END OF PACKET (EOP) 206 | DATAFLAG 302 |
|---|---|---|---|---|
| L7 | PKT#3 | 0 | 0 | 1 |
| L6 | | 1 | 0 | 1 |
| L5 | GAP | 0 | 0 | 0 |
| L4 | | 0 | 1 | 1 |
| L3 | PKT#2 | 0 | 0 | 1 |
| L2 | | 1 | 0 | 1 |
| L1 | GAP | 0 | 0 | 0 |
| L0 | PKT#1 | 0 | 1 | 1 |

FIG. 3-1

300b OUTPUT

| LANES | | START OF PACKET (SOP) 204 | END OF PACKET (EOP) 206 | IN_FLIGHT 304 |
|---|---|---|---|---|
| L7 | PKT#3 | 0 | 0 | 1 |
| L6 | | 1 | 0 | 1 |
| L5 | GAP | 0 | 0 | 0 |
| L4 | | 0 | 0 | 0 |
| L3 | PKT#2 | 0 | 0 | 0 |
| L2 | | 0 | 0 | 0 |
| L1 | GAP | 0 | 0 | 0 |
| L0 | PKT#1 | 0 | 1 | 1 |

FIG. 3-2

400a INPUT

| LANES | | START OF PACKET (SOP) 204 | END OF PACKET (EOP) 206 | ERROR_FLAG 402 |
|---|---|---|---|---|
| L7 | | 0 | 0 | 0 |
| L6 | PKT#2 | 0 | 0 | 1 |
| L5 | | 1 | 0 | 0 |
| L4 | GAP | 0 | 0 | 0 |
| L3 | | 0 | 1 | 0 |
| L2 | PKT#1 | 0 | 0 | 0 |
| L1 | | 0 | 0 | 1 |
| L0 | | 0 | 0 | 0 |

FIG. 4-1

400b OUTPUT

| LANES | | START OF PACKET (SOP) 204 | END OF PACKET (EOP) 206 | IN_ERROR 404 |
|---|---|---|---|---|
| L7 | | 0 | 0 | 1 |
| L6 | PKT#2 | 0 | 0 | 1 |
| L5 | | 1 | 0 | 0 |
| L4 | GAP | 0 | 0 | 0 |
| L3 | | 0 | 1 | 1 |
| L2 | PKT#1 | 0 | 0 | 1 |
| L1 | | 0 | 0 | 1 |
| L0 | | 0 | 0 | 0 |

FIG. 4-2

HIGH THROUGHPUT PACKET STATE PROCESSING

TECHNICAL FIELD

The following description relates to integrated circuit devices ("ICs"). More particularly, the following description relates to a high-throughput packet state processing machine for an IC.

BACKGROUND

In various communication networks, data may be split into discrete packets for transmission and routing across a network. When routed, packets may incur errors that can result in packets that are too small or contain incorrect bits. In some instances a packet may be considered too small if it is below a certain threshold, such as 64 bits. Additionally, a bit in a packet may undergo an incorrect bit-flip, due to network noise for instance, that may trigger an error when the packet is later checked using a checksum. In that case, the packet with the error may be marked at a certain point, normally at the end of the packet. Packets that are too small and packets that contain errors may be referred to as "undesirable packets" in this specification. In some cases, undesirable packets may be filtered out of a data stream before the packets are assembled and processed at a destination.

Undesirable packets may be filtered using narrow buses (e.g., buses that are less than 512 bits wide) that have a number of lanes in a lane-by-lane process. Such a lane-by-lane process is serial in nature, because a given lane L requires the state of lane L−1 (i.e., the lane before lane L) as an input. This requirement creates a bottleneck that limits the above technique from achieving higher throughputs such as 400 Gb/s which requires a wide bus. Also, in many systems increasing the clock rate to overcome such a bottleneck is not an option, because of design reasons and/or physical constraints. Further, increasing the number of lanes to increase throughput (where throughput=data width*clock rate) may have a deleterious effect on the clock rate. For instance, if a clock rate is 300 MHz and the input data width is 1280 bits, then twenty 64-bit lanes may be used to filter the undesirable packets. However, because of the serial bottleneck, where lane L depends on lane L−1, as more lanes are added it takes longer and longer to serially process the incoming packets. Thus, for example, processing twenty 64-bit lanes using the serial process effectively reduces the performance of a 300 MHz clock to that of a 115 MHz clock.

SUMMARY

A system for processing data includes a filtering module having a first processing unit, wherein the filtering module further includes a merging network coupled to the first processing unit, and a state accumulator coupled to the first processing unit. The first processing unit is configured to output a first set of two sub-state vectors based at least in part on data in a first data unit having a plurality of lanes. The merging network is configured to provide a first output based at least in part on one or both of the two sub-state vectors. The state accumulator is configured to provide a state data based at least in part on the first output by the merging network.

A system for processing data includes a filtering module configured to receive a first data unit having data in a first plurality of lanes, the filtering module having a first processing unit. The first processing unit is configured for generating a first sub-state vector for the first data unit, the first sub-state vector having a value for one of the lanes that is based on whether the one of the lanes is for a packet that begins in the first data unit. The first processing unit is further configured for generating a second sub-state vector for the first data unit, the second sub-state vector having a value for the one of the lanes that is based on whether the one of the lanes is for a packet that continues through the first data unit, or that begins in a preceding data unit and ends in the first data unit. The system further comprises a merging network configured to provide a first output based at least in part on the first sub-state vector, the second sub-state vector, or both. The system further includes a state accumulator configured to provide a state data based at least in part on the first output provided by the merging network.

A method for processing data includes: receiving a first data unit by a filtering module that includes a first processing unit, the first data unit having data in a first plurality of lanes; generating a first sub-state vector for the first data unit by the first processing unit, the first sub-state vector having a value for one of the lanes that is based on whether the one of the lanes is for a packet that begins in the first data unit; generating a second sub-state vector for the first data unit by the first processing unit, the second sub-state vector having a value for the one of the lanes that is based on whether the one of the lanes is for a packet that continues through the first data unit, or that begins in a preceding data unit and ends in the first data unit; determining a first output by a merging network based at least in part on the first sub-state vector, the second sub-state vector, or both; and determining a state data for storage at a state accumulator, wherein the state data is based at least in part on the first output provided by the merging network.

Other features and advantages will be described below in the detailed description.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 to 3-2 illustrate an example of a data unit with data flag and in-flight values for filtering small packets.

FIGS. 4-1 to 4-2 illustrate an example of a data unit with error flag and in-error values for filtering packets with errors.

DETAILED DESCRIPTION

Figures 1, 2:
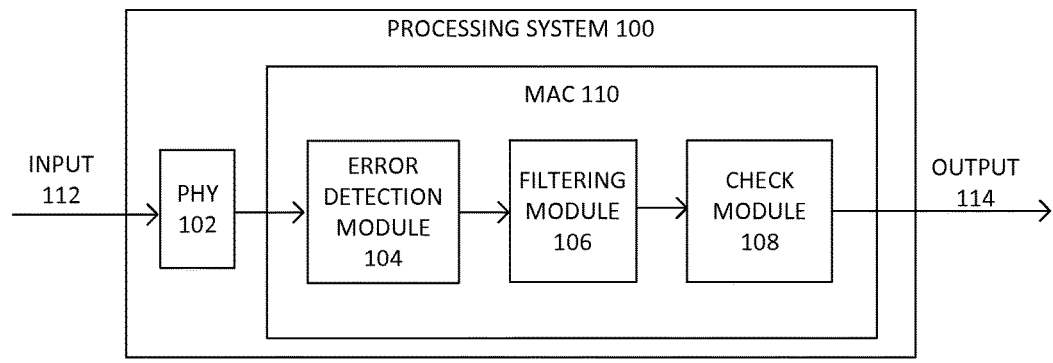
FIG. 1 illustrates an example of a processing system.
FIG. 2 illustrates an example of a data unit.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

It may be desirable to have an improved approach for network data processing in order to achieve higher data rates for meeting or exceeding high throughputs of high-speed applications. A parallel packet state processing system using two types of sub-state vectors is disclosed. The processing system may include a number of processing units that are configured to process data units in parallel, wherein each data unit may correspond a portion of a packet, a complete packet, or multiple packets. The sub-state vectors may include a first sub-state vector for a packet that starts within a data unit, and a second sub-state vector for a packet that continues through or terminates in a data unit. In some cases, packets may be preprocessed for the processing units to generate valid start packet data and valid end packet data. The processing units may then use the valid start packet data and valid end packet data, in addition to other data such as in-flight flag and/or in-error flags, to output the sub-state vectors. In some cases, the processing units may also output a packet continuance signal that indicates whether a packet is continuous through a processing unit. The processing system may further include a state accumulator module to carry state information across one or more processing cycles of the processing units.

In some cases, the processing system may be configured to process packets at a high rate, such as 400 Gb/s and higher. In other cases, the processing system may be configured to process packets at a rate that is lower than 400 Gb/s. The disclosed processing system is parallel in nature, because it splits data up for parallel processing by the processing units, while keeping track of the data using the two sub-state vectors. After the processing units processes the data, the processing system combines the sub-state vectors into a master state vector. The disclosed processing system is advantageous because it does not have a deleterious effect on clock rates and is scalable due to its parallel nature.

FIG. 1 illustrates an exemplary processing system 100 in which a parallel packet state processing system may be implemented. The processing system 100 may be a processor, such as a network processor, in one example. In another example, the processing system 100 may be a network card. In a further example, the processing system 100 may be any of other types of integrated circuits. As shown in the figure, the processing system 100 receives network communications in the form of packets, such as Ethernet packets, as input 112. The processing system 100 includes a physical layer (PHY) 102 and a media access control (MAC) 110. The PHY 102 may encode and/or decode the input 112 and pass it to the MAC 110. The MAC 110 includes an error detection module 104, a filtering module 106, and a check module 108. Within the MAC 110, the network communications may be processed through the error detection module 104, which processes the packets to create error flags and/or other data flags (collectively, "flagged data"). The filtering module 106 may then process the flagged data to filter out certain undesirable packets, such as small packets and error packets. The filtered packets may then be passed to the check module 108, where a series of checks, such as CRC checksums, may be performed on the filtered packets to ensure data integrity. After the packets have been flagged, filtered, and checked, they may be transmitted out of the processing system 100 as output 114 for further processing.

In some cases, the input to the error detection module 104 may be achieved using N lanes in parallel, where N is a positive integer. In such cases, the output of the error detection module 104 to the filtering module 106 will comprise packets that are in N lanes. Also, in some cases, the filtering module 106 may have processing units that are configured to process groups of the packets in parallel. For example, the input to the filtering module 106 may comprise N=16 lanes, and the filtering module 106 may have two processing units, with each processing unit processing 8 lanes of data.

FIG. 2 shows an exemplary data unit 200 that may be processed by the filtering module 106 in the processing system 100 of FIG. 1. The data unit 200 may be created by the error detection module 104, or by another module in the processing system 100. As shown in the figure, the data unit 200 includes a number of lanes L0-L7 for packet processing by the filtering module 106. In some cases, a lane may be 64-bit bits wide. In other cases, a lane may have other widths. As shown in the figure, a packet may be denoted by a start of packet (SoP) 204 (which is "1" in the example) and an end of packet (EoP) 206 (which is "1" in the example). In this example, packets are spaced by a lane (such as lanes L1, L5) having SoP=0 and EoP=0 to create a border between the packets. Also, a lane with SoP=0 and EoP=0 may represent a part of a packet that is not the beginning or an end of the packet if the lane is followed by another lane with EoP=1. Thus, in this example, lanes L0 belongs to packet (PKT) #1, which ends at L0 as denoted by the EoP value of "1", and starts somewhere before L0 (e.g., in a previous data unit). After PKT#1, there is a gap in lane L1 separating PKT#1 and PKT#2. PKT#2 starts in lane L2 as denoted by the SoP value of "1", and ends in lane L4 as denoted by the EoP value of "1". After PKT#2 ends in lane L4, there is a gap in lane L5 separating PKT#2 and PKT#3. Finally, PKT#3 starts in lane L6 as denoted by the SoP value of "1", continues out of the data unit to subsequent data unit(s).

FIGS. 3-1 to 3-2 show other exemplary data units 300a, 300b that may be used by the processing system 100 of FIG. 1. In the illustrated example, the data unit 300a may be an input for the filtering module 106 or an input for a component in the filtering module 106. The data unit 300b may be an output by the filtering module 106, or by a component in the filtering module 106. The data unit 300a is the same as that in FIG. 2, except that it includes an extra column for data flags 302 for filtering out small packets. As used in this specification, the term "small packet" may be a packet that is less than a certain number of bits or threshold, such as 512 bits, or other values. As shown in FIG. 3-1, a data flag with a value of "1" in a lane indicates that the lane corresponds to a packet having 64 bits of data. In the illustrated example, PKT#1 occupies lane L0 and ends in L0. Thus, the data flag for PKT#1 in lane L0 is set to "1". PKT#1 may have another portion in a preceding data unit (not depicted) and that portion may have data flag(s) set to "1". Similarly, lanes L2-L4 for packet PKT#2 have respective data flags set to "1", indicating that each of these lanes has 64 bits of data for PKT#2. Lanes L6-L7 for packet PKT#3 have respective data flags set to "1", indicating that each of these lanes has 64 bits of data for PKT#3.

In this example, it is assumed that packet PKT#1 continues from a preceding data unit, and has a total size that is larger than 512 bits. Also, it is assumed that packet PKT#3 continues to a subsequent data unit, and also has a total size that is larger than 512 bits. Accordingly, when the filtering module 106 processes the data unit 300*a*, packets PKT#1 and PKT#3 will not be filtered out. In contrast, PKT#2 has a SoP of "1" in L2 and an EoP of "1" in L4. Thus, packet PKT#2 has a size of 3×64 bits=192 bits, which is less than a filtering threshold of 512 bits in the example. Accordingly, packet PKT#2 will be filtered out.

In some cases, for a certain packet having a size below a threshold, an in-flight flag may be set to filter out that packet. As shown in FIG. 3-2, the data unit 300*b* has a third column for in-flight flags 304. The in-flight data values are set to "0" for lanes L2-L4 to indicate that packet PKT#2 is to be filtered out, because packet PKT#2 has a size below the threshold (e.g., it is a small size packet). In the illustrated example, because packet PKT#2 is to be filtered out, the SoP and EoP values for PKT#2 are also set to 0, as shown in the data unit 300*b* in FIG. 3-2.

FIGS. 4-1 to 4-2 show other exemplary data units 400*a*, 400*b* that may be used by the processing system 100 of FIG. 1. In the illustrated example, the data unit 400*a* may be an input for the filtering module 106 or an input for a component in the filtering module 106. The data unit 400*b* may be an output by the filtering module 106 or by a component in the filtering module 106. The data unit 400*a* has the same format as that in FIG. 2 except that data unit 400*a* includes an extra column for error flags 402 for indicating error in a particular lane for a packet. The data unit 400*b* has the same format as that in FIG. 2 except that the data unit 400*b* includes an extra column for in-error flags 404 for identifying a lane for a packet that has an error and all of the subsequent lanes for that packet. As shown in FIG. 4-1, packet PKT#1 contains an error in lane L1, as indicated by the error flag value of "1" in lane L1. Also, packet PKT#2 contains an error in lane L6, as indicated by the error flag value of "1" in lane L6.

In some cases, if a lane has been determined as having an error, all of the subsequent lanes for that packet may be marked as "in-error" to indicate that all of the lanes for that packet will need to be processed (analyzed, fixed, discarded, etc.) later. In the illustrated example shown in FIG. 4-2, because packet PKT#1 has an error in lane L1, lane L1 and all subsequent lanes L2-L3 for packet PKT#1 have an in-error flag of "1" in the data unit 400*b* as shown in FIG. 4-2. Similarly, because PKT#2 has an error in lane L6, all of the subsequent lanes L6-L7 for PKT#3 have an in-error flag of "1" in the data unit 400*b*.

In some cases, the examples shown in FIGS. 3-1 and 4-1 may be outputs of the error detection module 104 of FIG. 1 that are input to the filtering module 106. Also, in some cases, the examples shown in FIGS. 3-2 and 4-2 may represent outputs of the filtering module 106 of FIG. 1. In one implementation, for example, the error detection module 104 may receive a packet, and insert data flag values. The error detection module 104 may also find errors and insert error flag values. The filtering module 106 may then use the data flag values, the error flag values, and the SoP/EoP values, to create respective in-flight values like those shown in FIG. 3-2, and in-error values like those shown in FIG. 4-2.

Figure 5:
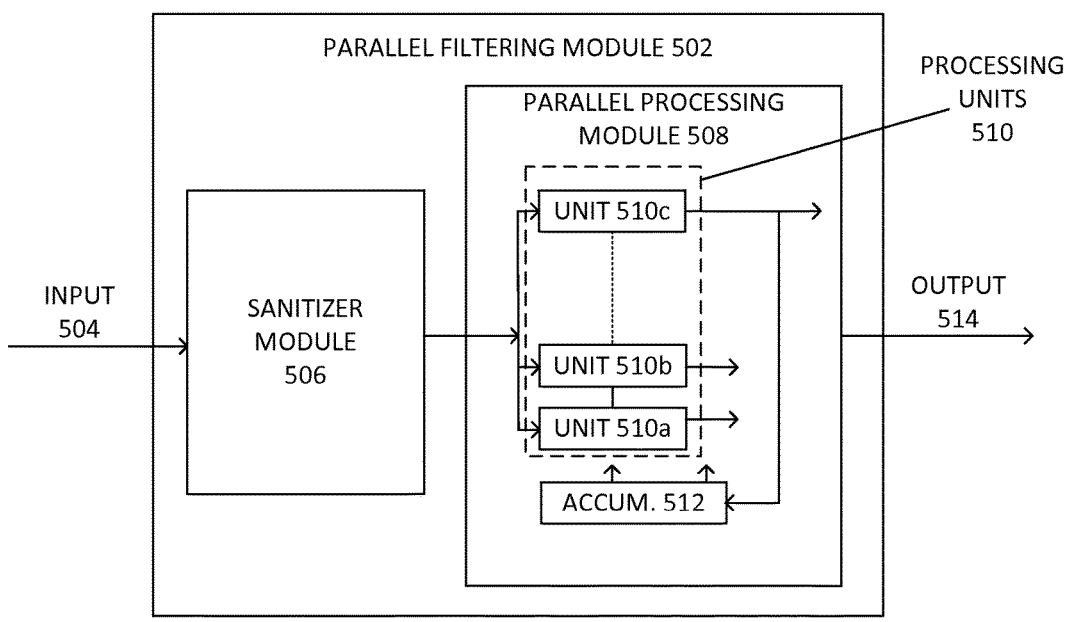
FIG. 5 illustrates an example of a parallel filtering module.
Figure 6:
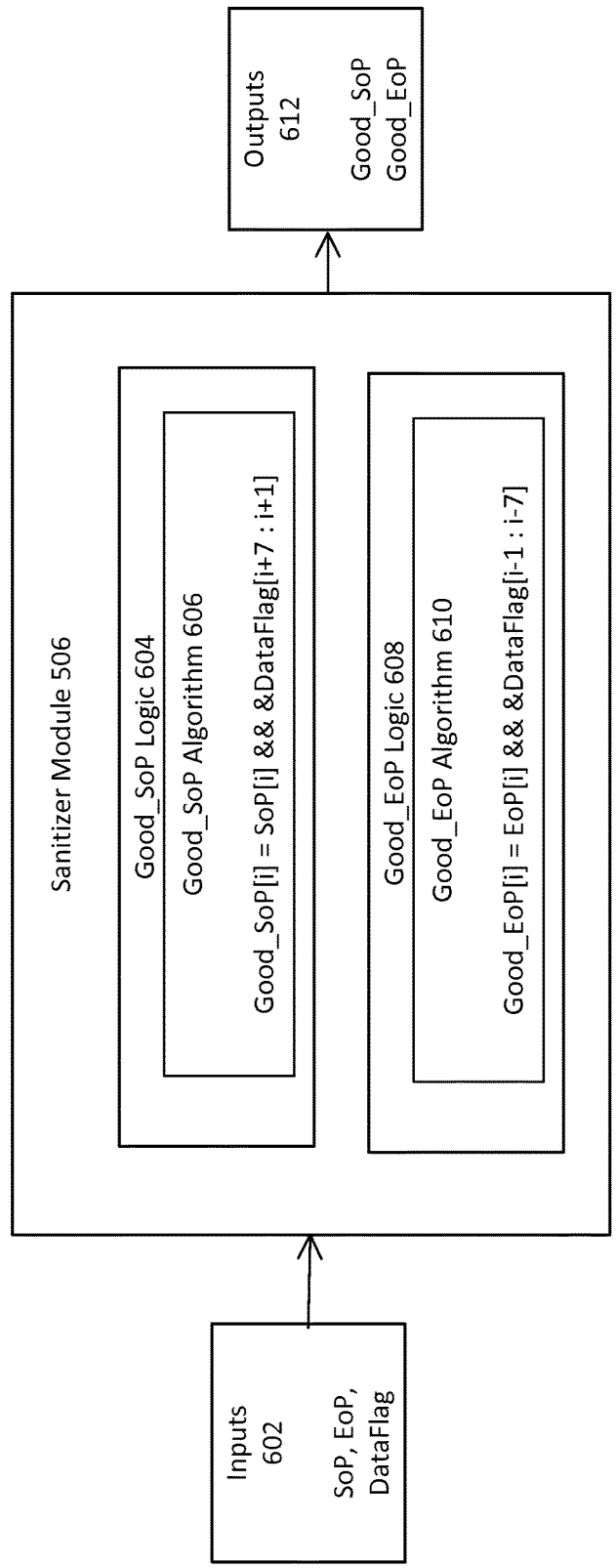
FIG. 6 illustrates an example of a sanitizer module.
Figure 7:
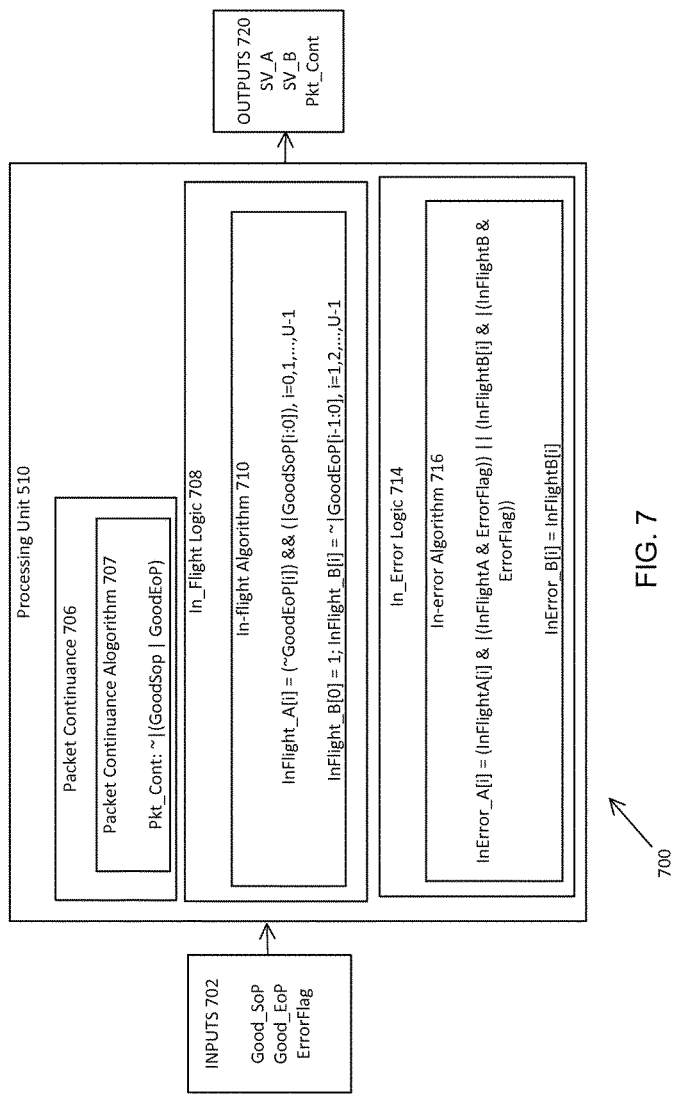
FIG. 7 illustrates an example of a processing unit that includes algorithms for creating sub-state vectors.

As discussed, the filtering module 106 may have multiple processing units for processing groups of data in parallel. Each group of data may be associated with (e.g., grouped into) U number of lanes like that shown in the examples of FIG. 2, 3-1, or 4-1. FIG. 5 illustrates an example of a parallel filtering module 502 that includes a sanitizer module 506 and a parallel processing module 508. The parallel processing module 508 has multiple processing units 510. An example of an implementation of the sanitizer module 506 is shown in FIG. 6, and an example of an implementation of one of the processing units 510 is shown in FIG. 7. The parallel filtering module 502 in FIG. 5 may be an example of the filtering module 106 shown in FIG. 1. The parallel filtering module 502 is configured to receive input 504 from the error detection module 104. For example, the parallel filtering module 502 may receive data in N number of lanes. The parallel processing module 508 is configured to divide the data in the N number of lanes into groups of data units for processing by the respective processing units 510, with each group having U number of lanes. For an 8-lane (i.e., U=8) data unit like that shown in FIG. 3-1/4-1, the parallel processing module 508 divides the data in the N number of lanes into groups of 8-lane data, like that shown in the example of the data unit 300*a*/400*a*.

In the parallel filtering module 502 shown in FIG. 5, the sanitizer module 506 is configured to process data in a data unit to create valid packet start data ("Good_SoP") and valid packet end data ("Good_EoP") data. The Good_SoP and Good_EoP data will be used by the parallel processing unit 508 for packet filtering. In some cases, Good_SoP may be defined as a lane having a SoP of "1" followed by seven sequential lanes that have valid packet data (e.g., seven subsequent lanes with data flag of "1"). If there are seven sequential lanes having valid packet data following a SoP lane (which also carries valid packet data), that means there are eight consecutive lanes of valid packet data. In one example, each lane carries 64 bits of packet data. Accordingly, a SoP of "1" represents at least 8 lanes×64 bits=512 bits or more of packet data starting with the lane having SoP of "1".

Similarly, Good_EoP may be defined as a lane having an EoP of "1" preceded by seven sequential lanes that have valid packet data (e.g., seven preceding lanes with data flag of "1"). If there are seven sequential lanes having valid packet data preceding an EoP lane (which also carries valid packet data), that means there are eight consecutive lanes of valid packet data. In one example, each lane carries 64 bits of packet data. Accordingly, an EoP of "1" represents at least 8 lanes X 64 bits=512 bits or more of packet data ending at the lane with EoP of "1".

In other cases, there may be more than 8 lanes (e.g., U>8), or fewer than 8 lanes (e.g., U<8), for each data unit. Also, in other cases, there may be more than 64-bits, or fewer than 64-bits, for each lane.

The sanitizer module 506 may be implemented using hardware, software, or combination of both.

In some cases, a Good_SoP algorithm may be employed to determine the Good_SoP values. For example, the Good_SoP algorithm may determine whether there are at least 8 consecutive 64-bit lanes following the lane that has a SoP value of "1". Similarly, a Good_EoP algorithm may be employed to determine the Good_EoP values. For example, the Good_EoP algorithm may determine whether there are at least seven consecutive 64-bit lanes preceding the lane that has an EoP value of "1".

FIG. 6 illustrates an example of the algorithms that the sanitizer module 506 may use to determine Good_SoP values and Good_EoP values. The sanitizer module 506 uses SoP data, EoP data and data flags as N-bit vector input 602 (which may be an example of the input 504 in FIG. 5), where "N" may correspond to the total number lanes for receiving the input 602. In some cases, N is at least equal to the total number of lanes in all of the processing units 510 that are being used. For example, if only processing unit 510*a* and 510*b* are used, where each unit has U=8 lanes, then N is at least equal to 8+8=16. Thus, in some cases, the width of the sanitizer module 506 is at least equal to the total width of all of the lanes of the processing units 510 being used. In this way the sanitizer module 506 processes data in parallel at the same rate as the processing units 510, and does not create a limit or bottleneck for the processing units 510.

In the illustrated example, the sanitizer module 506 contains a Good_SoP logic module 604 that uses a Good_SoP algorithm 606 to generate a Good_SoP N-Bit vector. The sanitizer module 506 also contains a Good_EoP logic module 608 that uses a Good_EoP algorithm 610 to generate a Good_EoP N-Bit vector. The Good_SoP N-Bit vector and the Good_EoP N-Bit vector form an output 612.

In some cases, the Good_SoP and Good_EoP vectors may be determined by the algorithms 606, 610 using AND gates, such as "&&". In the illustrated example, the algorithm 606 uses the notation "& DataFlag[i+7:i+1]". This equals DataFlag[i+7] & DataFlag[i+6] & . . . DataFlag[i+1]. In other words, it is aggregating eight DataFlag values using AND gates.

An example of how the above technique may be used to determine Good_SoP and Good_EoP is now described with reference to the packet PKT#2 in FIG. 3-1. The packet PKT#2 has a SoP value of "1" in lane L2, and an EoP value of "1" in lane L4. Further, there are no seven lanes after the SoP lane L2, nor before the EoP lane L4, for packet PKT#2. Accordingly, the Good_SoP and Good_EoP should be both "0" for packet PKT#2 in the example of FIG. 3-1. As shown in FIG. 6, the Good_SoP algorithm 606 combines the SoP value for the i'th lane and the data flag values for the seven following lanes (e.g., "i+7:i+1") using AND logic to output either a "1" indicating a Good_SoP, or a "0" indicating an absence of a Good_SoP. Similarly, the Good_EoP algorithm 610 combines the EoP value for the i'th lane and the data flag values for the seven preceding lanes (e.g., "i−1:i−7") using AND logic to output either a "1" indicating a Good_EoP, or a "0" indicating an absence of a Good_EoP.

With respect to the Good_SoP determination, the Good_SoP algorithm is applied for each lane in parallel. Take lane L2 as an example: Good_SoP[2]=SoP[2] && &DataFlag[9:3] yields "0". This AND logic combines the SoP value of lane L2 with data flag values of lanes 3 through 9 as an 8-way AND operation (where lanes higher than lane L7 are in an adjacent data unit being processed in parallel by another processing unit, or are in the next processing cycle). If any of the lanes L3 through L9 do not contain a data flag value of "1", the 8-way AND operation is not logically true, and "0" is returned. Following the above example, lanes L3 and L4 have a data flag value of "1". However, lane L5 does not have a data flag value of "1" because it is a "gap" between PKT#2 and PKT#3. Since Good_SoP requires that a SoP lane must be followed by seven lanes of data flag values of "1", the 8-way AND logic is not logically true in this example. Accordingly, "0" is output as the Good_SoP value for lane L2.

With respect to the Good_EoP determination, the Good_EoP algorithm is applied for each lane in parallel. Take lane L4 as an example: Good_EoP[4]=EoP[4] && &DataFlag [10:4] yields "0". This is because the AND logic combines the EoP value of lane L4 with data flag values of the preceding seven lanes as an 8-way AND operation. If at any point any of the seven preceding lanes do not contain a data flag value of "1", the 8-way AND operation is not logically true, and "0" is returned. Applied here to the data 300*a* in FIG. 3-1, an EoP of "1" for L4 exists for packet PKT#2, and the data flags for the preceding seven lanes are checked. Lanes L3 and L2 have a data flag value of "1". However lane L2 does not have a data flag value of "1" because it's a "gap" between packet PKT#1 and packet PKT#2. Since Good_EoP requires that an EoP lane must be preceded by 7 lanes having data flag values of "1", the 8-way AND logic is not logically true in this example. Accordingly, "0" is output as the Good_EoP value for lane L4.

As shown in FIG. 6, the output 612 of the sanitizer module 506 comprises a Good_SoP vector and a Good_EoP vector. In some cases, the Good_SoP vector and Good_EoP vector are N-bit vectors, which are later divided by the parallel processing module 508 into multiple U-bit Good_SoP vectors and multiple U-bit Good_EoP vectors for processing by the respective processing units 510. In other cases, the dividing of the N-bit Good_SoP vector and the N-bit Good_EoP vector may be performed by the sanitizer module 506. Following the above example, the U-bit Good_SoP vector for the data unit 300*a* is [0, 0, 0, 0, 0, 0, 1, 0] for lanes L0-L7, respectively, assuming PKT#3 has 7 good lanes following lane L6. Also, following the above example, the U-bit Good_EoP vector for the data unit 300*a* is [1, 0, 0, 0, 0, 0, 0, 0] for lanes L0-L7, respectively, assuming PKT#1 has 7 good lanes preceding lane L0.

Returning to FIG. 5, after the Good_SoP vector and the Good_EoP vector are determined, the sanitizer module 506 then outputs the Good_SoP and Good_EoP values to the parallel processing module 508. As shown in FIG. 5, the parallel processing module 508 includes a number of processing units 510*a*-510*n*. Each processing unit 510 may use the Good_SoP and Good_EoP data as inputs. Each processing unit 510 may also use error flag values output from the error detection module 104 as inputs in some cases.

In the illustrated example, each processing unit 510 is configured to handle a subset of the input data and generate partial results in parallel. In particular, each processing unit 510 is configured to output two sub-state (SV) vectors and a packet continuance data based on the Good_SoP and Good_EoP inputs. The sub-state vectors and the packet continuance data represent respective states of the data unit being processed by the processing unit 510. Once the two sub-state vectors are created, they may be merged using a merging network to produce a master state vector as an output 514. As shown in FIG. 5, the parallel filtering module 502 may also include a state accumulator 512. The state accumulator 512 is configured to transfer a state resulted from one processing cycle of the processing units 510 to a next processing cycle. For example, if a last processing unit 510*n* contains a packet with a SoP value of "1" but no EoP value of "1" (indicating that the packet being processed is cut off in the last processing unit 510*n*), the state from the current processing cycle may be transferred to the next cycle via the state accumulator 512. The state accumulator 512 and its operation will be discussed in further detail below.

FIG. 7 illustrates a block diagram 700 of a processing unit 510. The processing unit 510 includes a packet continuance module 706, an in-flight logic module 708, and an in-error logic module 714. During use, the processing unit 510 receives Good_SoP, Good_EoP values, and error flag values, as inputs 702. In some cases, each of these inputs is a "U-bit" vector input, where U is equal to the number of lanes in each data unit.

The packet continuance module 706 of the processing unit 510 is configured to output a 1-bit packet continuance data (Pkt_cont data) that indicates whether the data unit being processed by the processing unit 510 is for a packet that continuous through the data unit. The packet continuance module 706 has a packet continuance algorithm 707. In the packet continuance algorithm 707, (Good_SoP|Good_EoP) means the bitwise OR of the two vectors, which produces a vector V. So the expression "|(Good_SoP|Good_EoP)"=|V means V[U−1]|V[U−2]| . . . V[0], which produces a 1-bit result. The continuance algorithm 707 operates as follows. If neither Good_SoP of "1" nor Good_EoP of "1" are in a data unit, that means the data unit contains a packet with a start of packet (SoP=1) located in a previous data unit, and an end of packet (EoP=1) located in a subsequent data unit. In such case, the packet continuance algorithm 707 produces a "1" as the Pkt_cont data to indicate that the data unit contains an intermediate portion of a packet (i.e., a packet that starts in a previous data unit, and ends in a subsequent data unit). On the other hand, if either a Good_SoP of "1" or a Good_EoP of "1" are present in a data unit, that means the packet either starts or ends in the data unit. In such case, the continuance algorithm 707 then produces a "0" to indicate that the packet either starts or ends in the data unit.

The packet continuance module 706 may be implemented using hardware, software, or combination of both.

The in-flight logic module 708 includes an in-flight algorithm 710 for determining InFlight SV_A vector and InFlight SV_B vector. In the in-flight algorithm 710, "||" represents an OR gate in logic. Also "A|B" means bitwise OR of two vectors A and B, which results in another vector. The algorithm for InFlight SV_A is for packet that starts within a data unit. On the other hand, the algorithm for InFlight SV_B is for packet that continues through a data unit (e.g., an intermediate portion of a packet), or that starts in a previous data unit and terminates within the current data unit. In one example, the in-flight algorithm 710 determines a value in the InFlight SV_A vector for a certain lane to be "1" if the lane is for a packet that starts within the data unit, and is above a minimum size. Otherwise, the in-flight algorithm 710 outputs a "0" for certain values in the InFlight SV_A vector to filter out packet smaller than a prescribed minimum size. The in-flight algorithm 710 also determines the InFlight SV_B for a certain lane to be "1" if the lane is for a packet that is continuing or terminating within the data unit, and is above a minimum size. The in-flight algorithm 710 outputs a "0" otherwise to filter out packet smaller than the minimum size. In some cases, the InFlight SV_A may be a first U-bit sub-state vector. Also, in some cases, the InFlight SV_B may be a second U-bit sub-state vector.

Using the packet PKT #2 in FIG. 3-1 as an example, a portion of the Good_SoP vector for lanes L2-L4 corresponding with PKT#2 is [0, 0, 0], and a portion of the Good_EoP vector for lanes L2-L4 is [0, 0, 0]. These values are input into the in-flight logic module 708. In this example, each processing unit 510 processes eight lanes, and therefore U in the in-flight algorithm 710 is equal to 8. The in-flight algorithm 710 calculates InFlight_A[2] (i.e., for lane L2) as follows: InFlight_A[2]=(~GoodEoP[2]) && (|GoodSoP[2: 0]). The first part of the expression checks whether the negation of lane L2's Good_EoP value is true. Here, lane L2's Good_EoP value is "0". Lane L2's Good_EoP value of "0" is negated to 1 by "~" in the in-flight algorithm 710. Thus, the expression (~GoodEoP[2]) is equal to "1". This result is combined using a 4-way AND gate with Good_SoP values for lanes L2 to L0. Because lane L2 does not contain a Good_SoP value, as determined previously by the sanitizer module 506, the 4-way AND gate returns a "0" for InFlight_A[2] as the in-flight value of lane L2, as shown in FIG. 3-2. Similarly, InFlight_A for lane L3 and lane L4 is "0" using the same in-flight algorithm 710. Thus, the lanes L2-L4 for PKT#2 have InFlight_A value of "0" (i.e., a portion of the InFlight SV_A vector is [0, 0, 0] for lanes L2-L4 of PKT#2), which filters out PKT#2 as shown in FIG. 3-2.

In the above example, the algorithm for InFlight SV_A is used for lanes L2-L4 because those lanes are for packet PKT#2 that begins in the data unit (i.e., the state of packet PKT#2 does not depend on a previous unit). Similarly, because packet PKT#3 begins in the data unit, the algorithm for InFlight SV_A will calculate the values for lanes L6-L7 as "1". On the other hand, since packet PKT#1 ends in the data unit, the InFlight SV_A algorithm will calculate a value of "0" for lane L0, and the InFlight SV_B algorithm will calculate a value of "1" for lane L0. Also, the values for lanes L1-L7 in InFlight SV_B are calculated by the SV_B algorithm to be "0". Accordingly, in this example, the InFlight SV_A vector is [0, 0, 0, 0, 0, 0, 1, 1], and the InFlight SV_B vector is [1, 0, 0, 0, 0, 0, 0, 0]. The master state vector is the combination of InFlight SV_A and InFlight SV_B. In the illustrated example, "1" values from InFlight SV_A are combined with "1" values from Inflight SV_B to obtain a master state vector. Following the above example, the master state vector is equal to [1, 0, 0, 0, 0, 1, 1], as shown in FIG. 3-2. In some cases, the master state vector may be determined by a merging network based on the two sub-state vectors InFlight SV_A, InFlight SV_B, and input from preceding processing units 510 using a merging network that considers output from the processing units 510.

The in-flight logic module 708 may be implemented using hardware, software, or combination of both hardware and software.

The in-error logic module 714 includes an in-error algorithm 716 that determines InError SV_A vector and InError SV_B vector. The algorithm for InError SV_A is for packet that starts within a data unit. The algorithm for InError SV_B is for packet that continues through the data unit (e.g., an intermediate portion of a packet), or terminates within the data unit but starts from a preceding data unit. In some cases, the in-error algorithm 716 checks whether a lane for a packet under consideration is in-flight. If the lane for the packet is in-flight, and has an error flag, then the algorithm 716 outputs a "1" for that lane to indicate that the lane has an error. Otherwise, the algorithm 716 outputs a "0" to indicate no error.

The in-error logic module 714 may be implemented using hardware, software, or combination of both.

After the InError SV_A and InError SV_B are determined, these two sub-state vectors are then combined to form a master state vector. For example, "1" values from InError SV_A are combined with "1" values from InError SV_B to obtain a master state vector. For example, the master state vector for the in-error case (in-error master state vector) is equal to [0, 1, 1, 1, 0, 0, 1, 1], as shown in FIG. 4-2. In some cases, the master state vector may be determined using a merging network based on the two sub-state vectors, as well as output from the preceding processing units 510. The merging network will be described with reference to FIGS. 8-9.

As shown in FIG. 7, each processing unit 510 is configured to provide an output, which includes two sub-state vectors SV_A, SV_B, and a Pkt_cont data. In some cases, the sub-state vectors SV_A, SV_B may be in-flight SV vectors. In other cases, the sub-state vectors SV_A, SV_B may be in-error SV vectors. In further cases, the sub-state vectors SV_A, SV_B may be any of other types of sub-state vectors representing any state of a packet.

In both the in-flight and in-error cases, the two sub-state vectors are combined to produce a master state vector using a merging network. For example, the sub-state vectors InFlight SV_A and InFlight SV_B may be combined using the merging network to produce a master InFlight vector. Similarly, the sub-state vectors InError SV_A and InError SV_B may be combined using the merging network 814 to produce a master InError vector. In some cases, the merging network may be configured to combine two sub-state vectors SV_A, SV_B into a master state vector SV based on the logic: SV[i]=SV_A[i]|(SV_B[i] & State_prev). In such logic, SV_A may be sub-state vector InFlight SV_A, InError SV_A, any of other sub-state vector representing a partial state of a packet, or any combination of the foregoing. Similarly, SV_B may be sub-state vector InFlight SV_B, InError SV_B, any of other sub-state vector representing a partial state of a packet, or any combination of the foregoing. State_prev refers to the state of previous units. In some cases, SV_A[i]×SV_B[i]=1. The merging network will be described with reference to FIGS. 8-9.

As shown in FIG. 7, the Good_SoP and Good_EoP vectors, as well as the error flag values, are inputs 702 for a processing unit 510. In such cases, the in-error logic module 714 is configured to use the error flag values to compute InError SV_A, InError SV_B after the in-flight data are computed by the in-flight logic module 708. Thus, the SV_A, SV_B outputs 720 of the processing unit 510 represent in-error sub-states. In other cases, the inputs 702 may not include any error flag values, and the processing unit 510 may not include the in-error logic module 714. In such cases, the SV_A, SV_B outputs 720 of the processing unit 510 represent in-flight sub-states, and are based on output from the in-flight logic module 708.

Also, in some cases, the processing units 510 are configured to filter out small packets first, and then process remaining packets to filter out packets with errors. This is advantageous because small size packets that are filtered out do not need to be processed for errors. For example, using packet PKT#2 in the above example in FIG. 3-1, the processing unit 510 may use the in-flight algorithm 710 to create in-flight values of "0" for the lanes of PKT#2, which effectively filters out PKT#2, as shown in lanes L2-L4 in FIG. 3-2. Because PKT#2 has already been filtered out by the in-flight algorithm 710, error marking is skipped in this example. Next, for other packets that are not filtered out, the processing units 510 may use the in-flight data and the error flag data (which may be provided from the error detection module 104 of FIG. 1) to create in-error values for error marking purposes, like that shown in FIGS. 4-1 and 4-2.

As shown in the above examples, each processing unit 510 is configured to output two sub-state vectors and a packet continuance data. Each value in the first sub-state vector represents a first sub-state (or interim state), and each value in the second sub-state vector represents a second sub-state, for a certain lane in the data unit. The first sub-state vector is for a packet whose state does not depend on a previous data unit (e.g., a packet that starts within the data unit), and the second sub-state vector is for a packet whose state depends on a previous data unit (e.g., a packet that continues through the data unit, or a packet that terminates in the data unit but starts in a preceding data unit). Such technique is advantageous because it decomposes a state of each lane in a data unit into two parts: one independent of previous units, and the other dependent on previous units.

Figure 8:
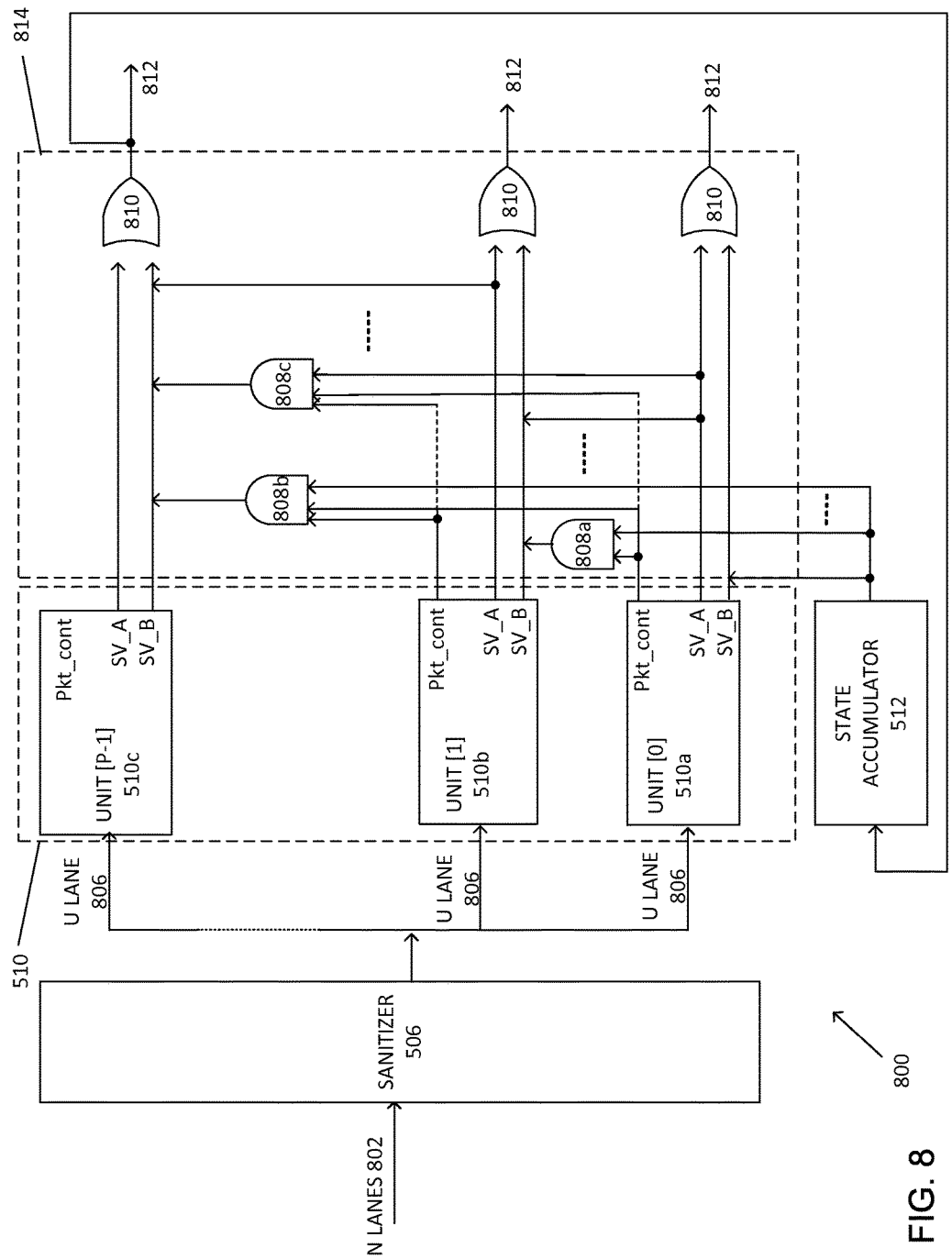
FIG. 8 is an example of an architecture diagram for a parallel filtering module.

FIG. 8 illustrates an architecture 800 for implementing a parallel filtering module. The architecture 800 may be used to implement the parallel filtering module 502 of FIG. 5 in one example. As shown in the figure, the sanitizer 506 receives input (e.g., from the error detection module 104 of FIG. 1, or from another component) via a N-lanes bus 802. The sanitizer 506 generates Good_SoP and Good_EoP vectors, as discussed. The Good_SoP and Good_EoP vectors are transferred on multiple busses 806 to respective processing units 510. In the illustrated example, three processing units 510a-510c are shown. However, it should be understood that in other cases, there may be more than three processing units 510, or fewer than three processing units 510 (e.g., one processing unit 510, or two processing units 510). Each of the processing units 510 generates two sub-state vectors, SV_A and SV_B, for the state under consideration, such as for the in-flight state or in-error state. Additionally, each of the processing units 510 also generates a packet continuance data to indicate whether a packet is continuous through a data unit being processed by that processing unit 510. The plurality of sub-state vectors and packet continuance data are then merged by the merging network 814. The merging network 814 may be a single state merging network. In other cases, the merging network 814 may be other types of merging network.

The merging network 814 comprises a plurality of logic gates 808, and a plurality of logic gates 810. In the illustrated example, there are three logic gate 808a-808c. In other examples, there may be more than three logic gates 808 or fewer than three logic gates 808. Also, in the illustrated example, each logic gate 808 is an AND gate. The logic gates 808 are configured to receive data from the state accumulator 512, and packet continuance data from preceding processing unit(s) 510. The logic gates 808 are also configured to generate respective outputs based on these data, which indicates whether a data unit being processed depends on previous unit(s). In some cases, the output of each logic gate 808 is coupled to a sub-network (such as that shown in the exploded view 906 of FIG. 9) for modifying one or more values in the sub-state vector SV_B output by a processing unit 510. The sub-network of FIG. 9 will be described in further detail below. In the illustrated example, each logic gate 810 is an OR gate. Each logic gate 810 is configured to output a master state vector 812 that is based at least in part on the sub-state vectors SV_A and SV_B. In other cases, the master state vector 812 may also be based at least in part on packet continuance data from one or more processing units 510 and/or data from the state accumulator 512 representing a state from a previous processing cycle. In one implementation, the master state vector 812 is based on the logic: SV[i]=SV_A[i]|(SV_B[i] & State_prev). In such logic, SV_A may be sub-state vector InFlight SV_A, InError SV_A, or any of other sub-state vector representing a partial state of a packet. Similarly, SV_B may be sub-state vector InFlight SV_B, InError SV_B, or any of other sub-state vector representing a partial state of a packet. State_prev refers to the state of previous unit(s) represented by the packet continuance data or data from the state accumulator 512. In the illustrated example, there are three logic gates 810 corresponding to the three processing units 510a-510c. In other examples, there may be more than three logic gates 810 or fewer than three logic gates 810.

In FIG. 8, the state accumulator module 512 is configured to transfer a state resulted from a processing cycle over additional processing cycle(s). For example, if a packet being processed by the last processing unit 510 (e.g., processing unit 510c in the example) is continuous through the last lane in the last processing unit 510, the value in the last lane (e.g., lane L7 in the example) of the master state vector output by the last logic gate 810 would be passed to the state accumulator 512 for use in the following processing cycle(s) by the processing units 510. For example, the master state vector 812 output from the last logic gate 812 may have a value of "1" for the last lane L7. This value is passed to the state accumulator 512 for use in the next processing cycle. In the next processing cycle, the "1" from the state accumulator is passed to the logic gate 808(s). In the next processing cycle, the processing units 510 process additional data units, and generate respective sub-state vectors SV_A, SV_B, and packet continuance data. The state accumulator 512 transfers the state from the previous processing cycle to outputs of the processing units 510 in the new processing cycle through the logic gates 808. The master state vector for the next processing cycle may then be determined based on the sub-state vectors SV_A, SV_B, the packet continuance data, and the transferred state from the state accumulator 512. In this way, packets that are cut off at the last processing unit 510 or very large packets can be processed over two or more processing cycles.

In regards to packet continuance, the AND gates 808a-808c in the merging network 814 are configured to use packet continuance data (each of which is a 1-bit signal (i.e., on/off)) that indicates whether a packet is continuous through a unit. In some cases, a packet continuance signal of "1" is required to show that in a given unit, there is no SoP or EoP (thus no Good_SoP nor Good_EoP data values), but that all the data is still In_Flight and should be passed to the higher units. For example, assume unit 510b outputs a packet continuance data of "1" (i.e., "Pkt_cont=1"). This packet continuance signal of "1" is input into an AND gate 808b, along with the packet continuance data from processing unit 510a, and the state data from the state accumulator 512. Because the AND gate 808b is a logical AND gate, the output is 1 if and only if all the inputs are "1". Thus, the packet continuance data from the processing units 510b, 510a and the state data collectively act as an on/off switch for the AND gate 808b. For example, if the packet continuance data from the processing unit 510b is "1", then the previous states are considered (assuming other inputs to the logic gate 808b are also "1"). However, if the packet continuance is "0", the output of the logic gate 808b will be "0", and thus previous states are not considered.

In some cases, for continuance processing, the sub-state vector SV_A output from one processing unit 510 (e.g., 510a) may only contribute its top most values for processing with the sub-state vector SV_B output from the following processing unit 510 (e.g., 510b). Thus, no packet continuance data is need when processing neighboring sub-state vectors. For example, the portion of the merging network 814 corresponding with the processing unit 510b does not need the entire sub-state vector SV_A from the preceding processing unit 510a as an input. Instead, the portion of the merging network 814 corresponding to the processing unit 510b uses the top most value (for the last lane) in the sub-state vector SV_A output from the processing unit 510a as a 1-bit signal that is applied using the sub-network shown in the exploded view 906 of FIG. 9.

Figure 9:
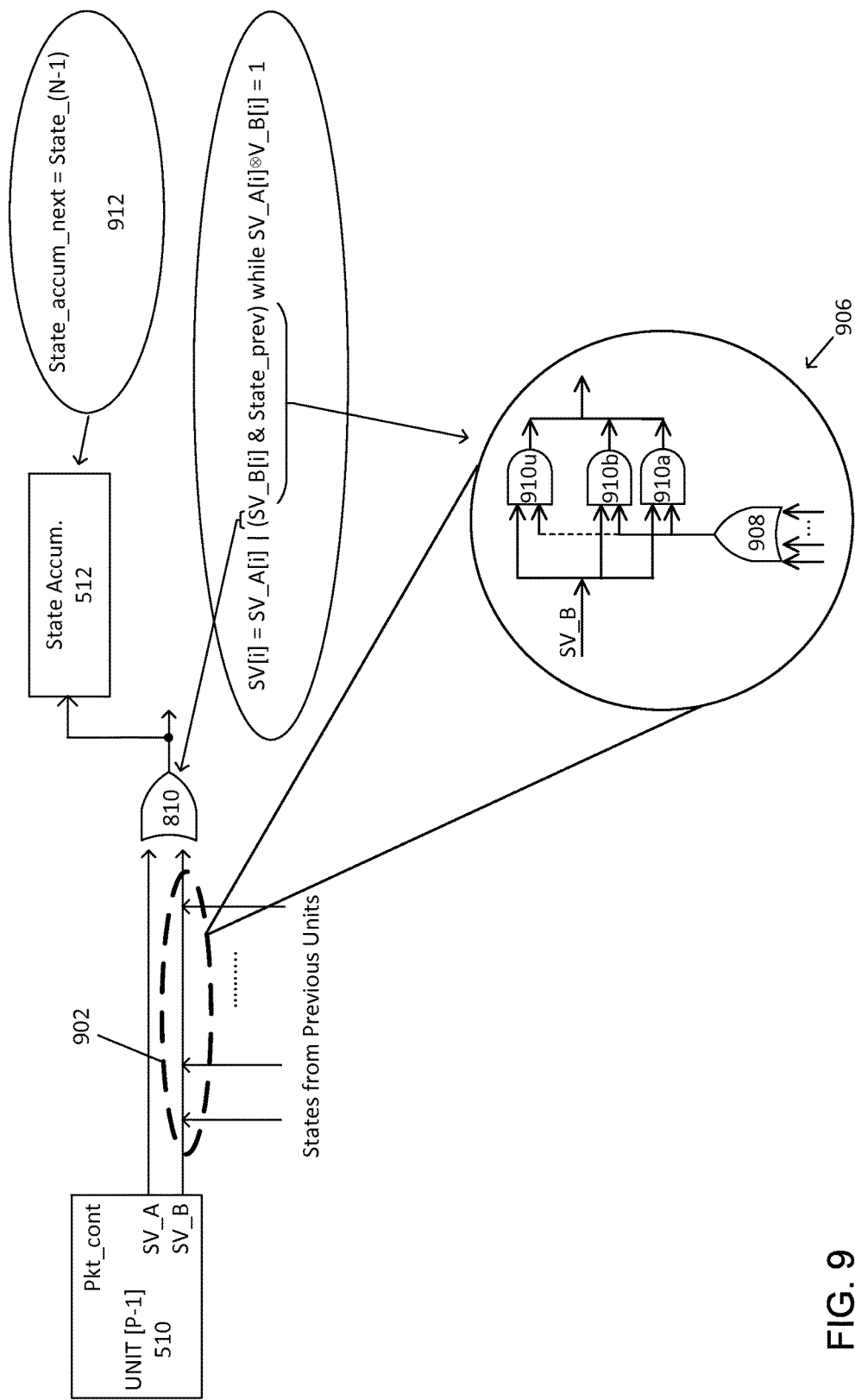
FIG. 9 is an example of a portion of a merging network.

FIG. 9 illustrates an example of a part of a merging network, which may be used in the merging network 814 in FIG. 8. As discussed, the merging network 814 is configured to merge results from the processing units 510. The merging network 814 is also configured to take into account packet continuance over the processing units 510 using the packet continuance data described previously, and over multiple processing cycles using state data from the state accumulator 512. FIG. 9 shows an exploded view 906 of a part 902 of the merging network 814. As shown in the figure, the part of the merging network that is coupled between the SV_B output of the processing unit 510 and its respective logic gate 810 includes a logic gate 908 and a plurality of logic gates 910a-910u. The number of logic gates 910a-910u is equal to the number of lanes in each data unit. As shown in the exploded view 906, the SV_B output of the processing unit 510n is coupled to the logic gates 910a-190u so that each of the logic gates 910a-910u receives a value in the sub-state SV_B vector output by the processing unit 510. Also, the logic gate 908 has an output that is coupled to inputs of the respective logic gates 910a-910u. The inputs of the logic gate 908 are the outputs of the logic gates 808, which indicate packet continuance through one or more processing units, and/or packet continuance through multiple processing cycles. Although only one logic gate 908 is shown, in the merging network 814, there may be multiple logic gates 908. In the illustrated example, the logic gate 908 is an OR gate, and the output of the logic gate 908 is either "1" or "0" representing whether there is packet continuance or not.

As shown in FIG. 9, the master state output from the logic gate 810 is based on the algorithm 904. According to the algorithm 904, the master state vector SV is based on the sub-state vector SV_A, the sub-state vector SV_B, and State_prev. In some cases, the master state vector has a value of "1" (for a certain lane) if SV_A="1" OR (SV_B AND State_Prev)="1". The second term (i.e., "SV_B & State_Prev") in the algorithm 904 ensures that a value in the sub-state vector SV_B output by the processing unit 510 is considered only if State_Prev=1. The State_prev may be contributed from any of the previous units or from the state accumulator 512. The State_Prev keeps track of packet that is continuous through multiple data units and/or through multiple processing cycles. In particular, the State_Prev is the output of the logic gate 908, and is equal to "1" if any of the input (e.g., the data from the state accumulator 512, packet continuance data from preceding processing unit(s) 510, or data value from a last lane of a previous sub-state vector SV_A) to the logic gate 908 is "1" (representing packet continuance). Otherwise, the output of the logic gate 908 is "0" (representing no packet continuance).

In the illustrated example, the logic gates 910 are AND gates, and they are configured to modify respective values in the SV_B vector output from the processing unit 510 based on the output of the logic gate 908. For example, in some cases, if a value for a lane in the SV_B vector is "1", and if the output of the logic gate 908 is "1", then the AND logic gate 910 produces a "1". In such cases, the output of the logic gate 910 (representing a modified SV_B vector value) has the same value as that in the original SV_B vector output by the processing unit 510. In other cases, if a value for a lane in the SV_B vector is "0", and if the output of the logic gate 908 is "1", then the AND logic gate 910 produces a "0". In such cases, the output of the logic gate 910 (representing a modified SV_B vector value) also has the same value as that in the original SV_B vector output by the processing unit 510. In further cases, if a value for a lane in the SV_B vector is "1", and if the output of the logic gate 908 is "0", then the AND logic gate 910 produces a "0". In such cases, the original SV_B vector value of "1" is modified to be "0" by the logic gate 910.

As shown in FIG. 9, the output of the sub-network in item 906 is combined with the SV_A vector output by the processing unit according to the algorithm 904. Based on the algorithm 904, a value for a lane in the master state vector is "1" if the sub-state vector SV_A that does not depend on previous units has a value of "1", but the value in the master state vector may also have a value "1" if both (a) the sub-state vector SV_B that does depend on previous units has a value "1" and (b) a state from previous unit(s) or processing cycle(s) is "1".

As shown in FIG. 9, the output of the logic gate 810 is a master state vector determined using the algorithm 904. The logic gate 810 is coupled to the state accumulator 512, and is configured to pass state data to the state accumulator 512. In the illustrated example, the state data is the value in the last lane in the master state vector output by the logic gate 810, and such state data is output by the state accumulator for the next processing cycle (as indicated by the algorithm 912). Also, in the illustrated example, the processing unit 510 is the last processing unit (e.g., the processing unit 510c in the example of FIG. 8). In other example, the processing unit 510 may not be the last processing unit. In such cases, the diagram in FIG. 9 may not include the state accumulator 512.

As illustrated in the above, the system and the method described herein are advantageous because the processing units 510 operate in parallel, and the filtering of undesirable packets by the processing units 510 do not require a lane-by-lane processing in which and each lane requires input from the immediately previous lane. Instead, using the system and method described herein, each processing unit 510 may simple use a 1-bit value to represent the state of previous unit(s), and the sub-states output from the processing units 510 can be combined based on the packet continuance data in a single state merging network according to the algorithm: SV=SV_A|(SV_B & State_Prev). Such a system can be scaled easily by simply adding more processing units 510 with no deleterious effects on the clock rate.

Figure 10:
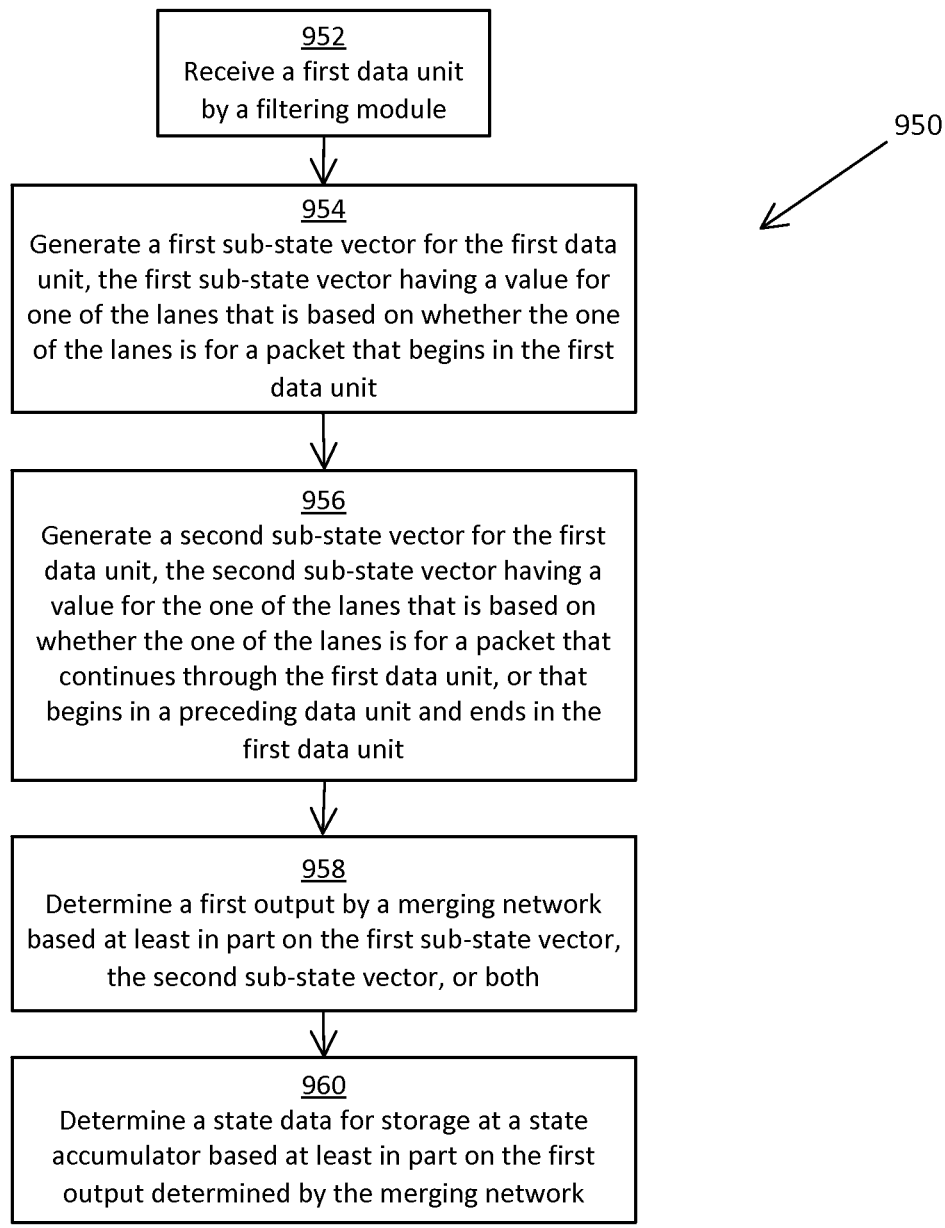
FIG. 10 illustrates an exemplary method for processing data.

FIG. 10 illustrates a method 950 that may be performed by the system 100 of FIG. 1. The method 950 includes receiving a first data unit by a filtering module (item 952). The filtering module may be the filtering module 502 of FIG. 5, and includes a plurality of processing units 510 having at least a first processing unit and a second processing unit arranged in parallel, like that described previously. In other cases, the filtering module may include only one processing unit 510. The first data unit may have data in a first plurality of lanes, such as that described with reference to the example of the data unit 300a in FIG. 3-1. In some cases, data in the first data unit may include start-of-packet (SoP) values for the respective lanes in the first data unit, and end-of-packet (EoP) values for the respective lanes in the first data unit. Also, in some cases, the first data unit may have a corresponding input data width that is 512 bits or less. This allows the first processing unit to handle no more than two packets. For example, the first processing unit may handle at least a portion of a packet terminating in the first data unit (e.g., a data unit with a EoP of "1"), at least a portion of another packet starting in the first data unit (e.g., a data unit with a SoP of "1"), or both. In another scenario, the first processing unit may also handle a portion of a packet that continues through the first data unit (e.g., a data unit with no EoP of "1" and no SoP of "1").

Next, the first processing unit generates a first sub-state vector for the first data unit (item 954). The first sub-state vector has a value for one of the lanes that is based on whether the one of the lanes is for a packet that begins in the first data unit. The value in the first sub-state vector may represent a first sub-state of the one of the lanes. In some cases, the first sub-state may be an in-flight state. For example, the in-flight state may be InFlight_A determined using the in-flight algorithm 710 of FIG. 7. In other cases, the first sub-state may be an in-error state. For example, the in-error state may be InError_A determined using the in-error algorithm 716 of FIG. 7. In further cases, the first sub-state may be any of other types of state.

The first processing unit also generates a second sub-state vector for the first data unit (item 956). The second sub-state vector has a value for the one of the lanes that is based on whether the one of the lanes is for a packet that continues through the first data unit (e.g., an intermediate portion of a packet), or that begins in a preceding data unit and ends in the first data unit. The value in the second sub-state vector may represent a second sub-state of the one of the lanes. In some cases, the second sub-state may be an in-flight state. For example, the in-flight state may be InFlight_B determined using the in-flight algorithm 710 of FIG. 7. In other cases, the second sub-state may be an in-error state. For example, the in-error state may be InError_B determined using the in-error algorithm 716 of FIG. 7. In further cases, the second sub-state may be any of other types of state.

In some cases, item 954 may be performed before item 956. In other cases, item 956 may be performed before item 954. In further cases, item 954 and item 956 may be performed simultaneously in parallel.

Next, a first output is provided by the merging network based at least in part on the first sub-state vector, the second sub-state vector, or both (item 958). In some cases, the first output may be a master state vector. In such cases, the first output is based on the first sub-state vector and the second sub-state vector. For example, the master state vector may represent an in-flight state, such as that shown in the third column in the example of FIG. 3-2. In another example, the master state vector may represent an in-error state, such as that shown in the third column in the example of FIG. 4-2. The master state vector may represent any of other states in other examples. In other cases, the first output may be any output generated by any of the logic gates in the merging network. For example, the first output provided by the merging network may be an output from any of the logic gates 808, 908, 910, 810 described previously with reference to FIGS. 8-9.

Next, a state data is determined based at least in part on the first output provided by the merging network (item 960). In some cases, the state data may be a value in the last lane of a master state vector. After the state data is determined, it is then passed to the state accumulator 512 for storage, so that the state accumulator 512 can provide the state data for subsequent processing cycle(s).

Optionally, the method 950 may also include receiving a second data unit by the filtering module, the second data unit having data in a second plurality of lanes. The method 950 may also optionally include generating a first sub-state vector for the second data unit by the second processing unit, the first sub-state vector for the second data unit having a value for one of the lanes in the second data unit that is based on whether the one of the lanes in the second data unit is for a packet that begins in the second data unit. The method 950 may also optionally include generating a second sub-state vector for the second data unit by the second processing unit, the second sub-state vector for the second data unit having a value for the one of the lanes in the second data unit that is based on whether the one of the lanes in the second data unit is for a packet that continues through the second data unit (e.g., an intermediate portion of a packet), or that begins in the first data unit and ends in the second data unit. The method 950 may also optionally include determining a second output by the merging network based at least in part on the first sub-state vector from the second processing unit, the second sub-state vector from the second processing unit, or both. In some cases, the state data may be determined based at least in part on the first output and the second output provided by the merging network. In some cases, the first processing unit and the second processing unit are configured to process the first data unit and the second data unit, respectively, in parallel. Also, in some cases, the first processing unit may be the processing unit 510a of FIG. 5, and the second processing unit may be the processing unit 510b of FIG. 5. In other cases, the first processing unit may be any of other processing units 510 in FIG. 5, and the second processing unit may be any of other processing units 510 in FIG. 5.

In some cases, one of the lanes in the first data unit may have a value (e.g., a SoP value of "1") indicating a beginning of a packet. Also, in some cases, the method 950 may further include determining whether a prescribed number of lanes following the one of the lanes is for the same packet. In some cases, such may be performed using the sanitizer module 506 described with reference to FIGS. 5-6. Also, in one example, the sanitizer module 506 may determine a Good_SoP value for a lane to be "1" using the Good_SoP algorithm 606 if seven subsequent lanes are for the same packet, as described previously.

Also, in some cases, one of the lanes in the first data unit may have a value (e.g., an EoP value of '1") indicating an end of a packet. The method may further include determining whether a prescribed number of lanes preceding the one of the lanes is for the same packet. In some cases, such may be performed using the sanitizer module 506 described with reference to FIGS. 5-6. Also, in one example, the sanitizer module 506 may determine a Good_EoP value for a lane to be "1" using the Good_EoP algorithm 610 if seven preceding lanes are for the same packet, as described previously.

In addition, in some cases, the first processing unit may generate a packet continuance data that indicates whether the first data unit is for a packet that continues through the first data unit (e.g., an intermediate portion of a packet). In such cases, the master state vector may be determined using a merging network based at least in part on the first sub-state vector, the second sub-state vector, and the packet continuance data.

Also, in some cases, the method 950 may include transferring a state resulted from a current processing cycle to a next processing cycle, like that described with reference to FIG. 8-9.

As illustrated above, the system and method disclosed herein are advantageous over the technique that filters packet lane-by-lane sequentially. This is because the processing technique described herein does not require information associated with a previous lane L−1 to be used as input to compute output for the current lane L. In some cases, such technique requires a latency of only two clock cycles: one cycle for sanitizing and sub-state vector computation, and one cycle for merging the sub-state vectors. Also, in some cases, to improve the latency, more processing unit(s) may be added to the processing system and/or the clock rate may be increased.

In the above examples, the processing system 100 has been described as having multiple processing units 510. In other cases, the processing system 100 may have only one processing unit 510 in the filtering module 106/502. In this case, the filtering module 106/502 may still include the merging network 814 to combine the state resulted from a processing cycle (output from the state accumulator 512) with the SV_B output from the single processing unit 510 in subsequent processing cycle(s). For example, there may be a large packet spanning multiple cycles (e.g., starts at a current processing cycle and ends at another subsequent processing cycle).

As discussed, The sub-state vector SV_A is for packet that starts within a data unit, and the sub-state vector SV_B is for packet that continues through a data unit (e.g., an intermediate portion of a packet), or that starts in a previous data unit and terminates within the current data unit. It should be noted that a data unit may or may not include the actual packet data. For example, in some cases, a data unit may include SoP values and EoP values for different respective lanes. Also, in some cases, in addition or in the alternative to the above, a data unit may include data flags and/or error flags for different respective lanes. In further cases, a data unit may include Good_SoP values and Good_EoP values for the different respective lanes. In still further cases, in any of the foregoing examples, the data unit may optionally include the actual packet data for the respective lanes. In addition, it should be noted that a data unit may refer to data being stored in different mediums and/or being processed by different modules. For example, if the SoP values and EoP values are being processed by the sanitizer module 506, while the actual packet data are being processed by another module or are being stored in a medium, the data unit may be considered as having the SoP values and the EoP values, or alternatively, as having the SoP values, the EoP values, and the actual packet data. Accordingly, a reference or a description regarding a packet starting within a data unit may refer to (1) to the data unit having actual packet data that is a beginning of a packet, or (2) the data unit having no actual packet data, but the actual packet data that is a beginning of a packet may be stored elsewhere in association with the data unit. Similarly, a reference or a description regarding a packet continuing through a data unit may refer to (1) the data unit having actual packet data that occupy all of the lanes in the data unit, or (2) the data unit having no actual packet data, but the actual packet data may be stored elsewhere in association with the data unit. Similarly, a reference or a description regarding a packet starting in a previous data unit may refer to (1) the previous data unit having actual packet data that is the beginning of the packet, or (2) the previous data unit having no actual packet data, but the actual packet data that is the beginning of the packet may be stored elsewhere in association with the previous data unit. Similarly, a reference or a description regarding a packet ending in a data unit may refer to (1) the data unit having actual packet data that is the end of the packet, or (2) the data unit having no actual packet data, but the actual packet data that is the end of the packet may be stored elsewhere in association with the data unit.

In some cases, one or more of the components of the processing system described herein may be implemented using a processing system, such as one or more processors. A processor may be a FPGA processor, an ASIC processor, a general purpose processor, etc.

Because one or more of the examples described herein may be implemented in an FPGA, a detailed description of such an IC is provided. However, it should be understood that other types of ICs may benefit from the features described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 11:
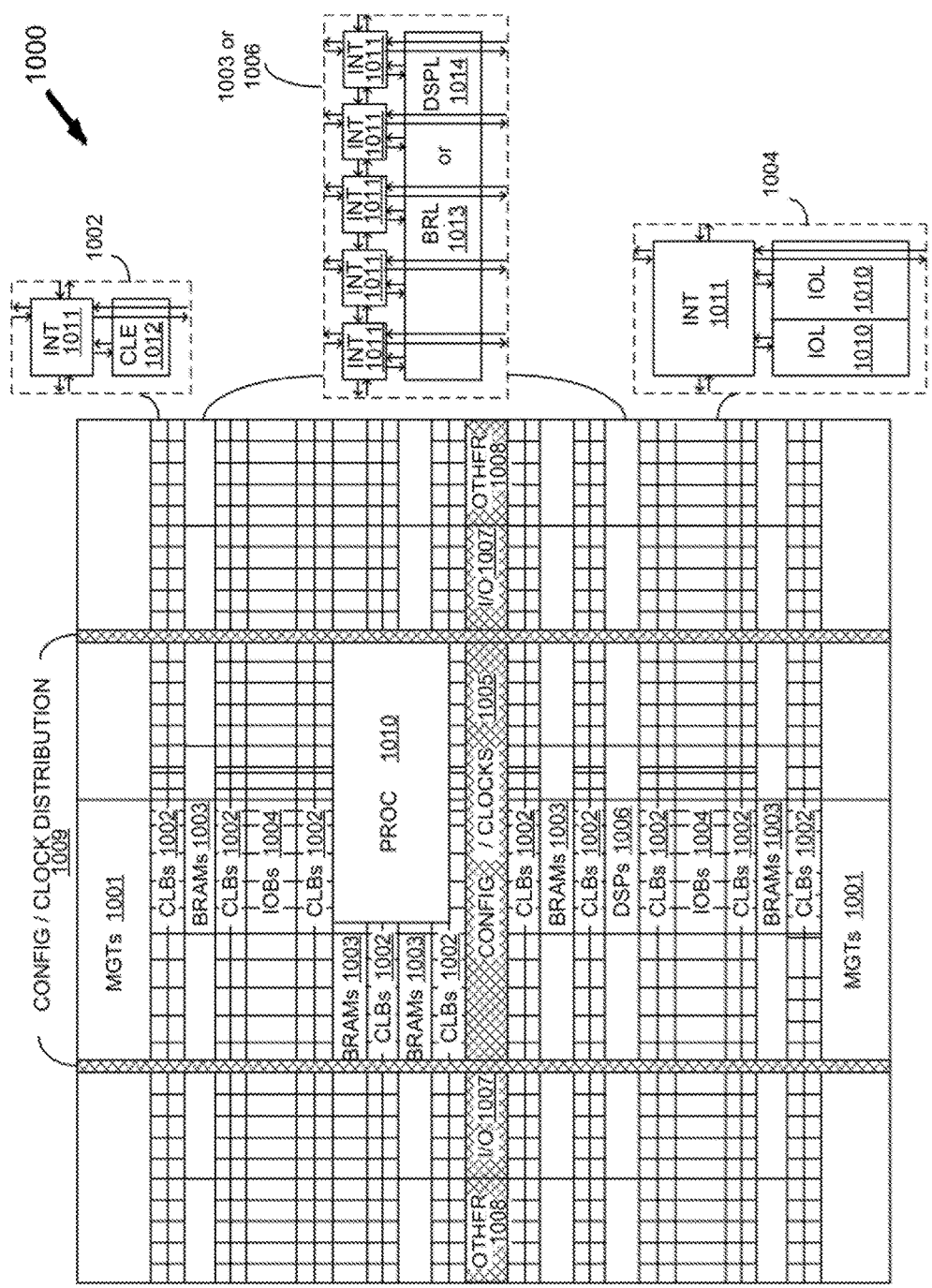
FIG. 11 is an exemplary Field Programmable Gate Array ("FPGA") architecture.

As noted above, advanced FPGAs can include several different types of programmable logic blocks in the array. For example, FIG. 11 illustrates an FPGA architecture 1000 that includes a large number of different programmable tiles including multi-gigabit transceivers ("MGTs") 1001, configurable logic blocks ("CLBs") 1002, random access memory blocks ("BRAMs") 1003, input/output blocks ("IOBs") 1004, configuration and clocking logic ("CONFIG/CLOCKS") 1005, digital signal processing blocks ("DSPs") 1006, specialized input/output blocks ("I/O") 1007 (e.g., configuration ports and clock ports), and other programmable logic 1008 such as digital clock managers, analog-to-digital converters, system monitoring logic, and so forth. Some FPGAs also include dedicated processor blocks ("PROC") 1010.

In some FPGAs, each programmable tile includes a programmable interconnect element ("INT") 1011 having standardized connections to and from a corresponding interconnect element in each adjacent tile. Therefore, the programmable interconnect elements taken together implement the programmable interconnect structure for the illustrated FPGA. The programmable interconnect element 1011 also includes the connections to and from the programmable logic element within the same tile, as shown by the examples included at the top of FIG. 11.

For example, a CLB 1002 can include a configurable logic element ("CLE") 1012 that can be programmed to implement user logic plus a single programmable interconnect element ("INT") 1011. A BRAM 1003 can include a BRAM logic element ("BRL") 1013 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 1006 can include a DSP logic element ("DSPL") 1014 in addition to an appropriate number of programmable interconnect elements. An IOB 1004 can include, for example, two instances of an input/output logic element ("IOL") 1015 in addition to one instance of the programmable interconnect element 1011. As will be clear to those of skill in the art, the actual I/O pads connected, for example, to the I/O logic element 1015 typically are not confined to the area of the input/output logic element 1015.

In the pictured example, a horizontal area near the center of the die (shown in FIG. 11) is used for configuration, clock, and other control logic. Vertical columns 1009 extending from this horizontal area or column are used to distribute the clocks and configuration signals across the breadth of the FPGA.

Some FPGAs utilizing the architecture illustrated in FIG. 11 include additional logic blocks that disrupt the regular columnar structure making up a large part of the FPGA. The additional logic blocks can be programmable blocks and/or dedicated logic. For example, processor block 1010 spans several columns of CLBs and BRAMs.

Note that FIG. 11 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 11 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 12:
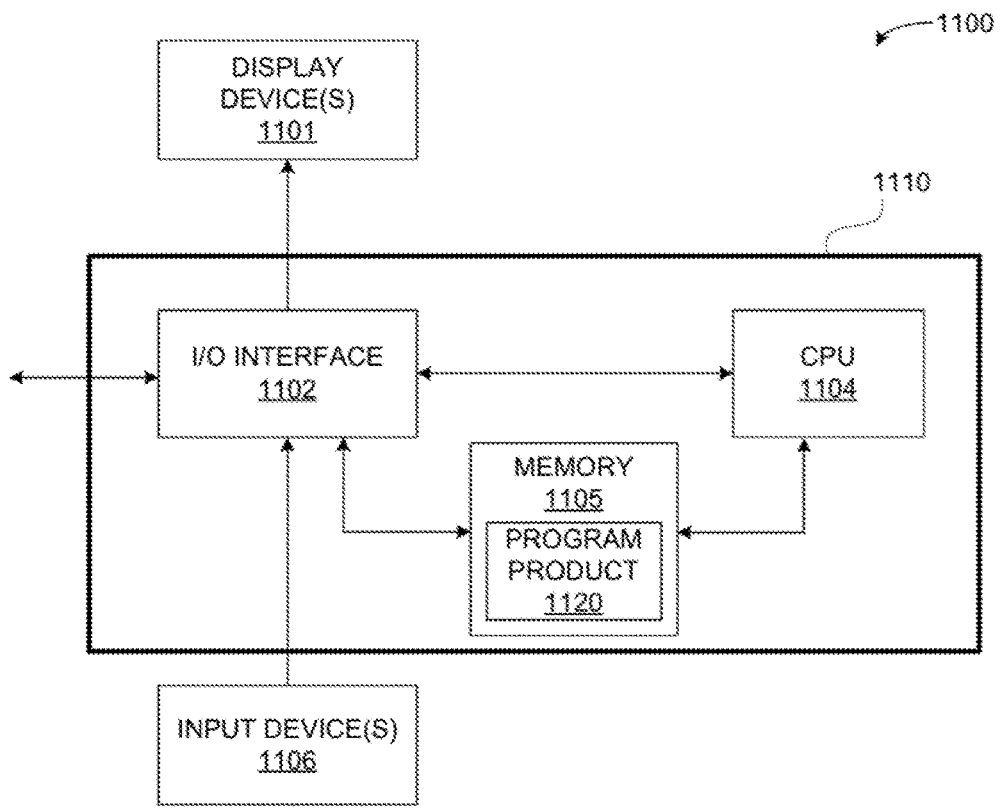
FIG. 12 is a block diagram depicting an exemplary computer system.

In other cases, one or more of the components of the processing system described herein may be implemented using a computer system 1100. FIG. 12 is a block diagram depicting an exemplary computer system 1100. Computer system 1100 may include a programmed computer 1110 coupled to one or more display devices 1101, such as Cathode Ray Tube ("CRT") displays, plasma displays, Liquid Crystal Displays ("LCD"), projectors and to one or more input devices 1106, such as a keyboard and a cursor pointing device. Other known configurations of a computer system may be used. Computer system 1100 by itself or networked with one or more other computer systems 1100 may provide an information handling system.

Programmed computer 1110 may be programmed with a known operating system, which may be Mac OS, Java Virtual Machine, Real-Time OS Linux, Solaris, iOS, Android Linux-based OS, Unix, or a Windows operating system, among other known platforms. Programmed computer 1110 includes a central processing unit (CPU) 1104, memory 1105, and an input/output ("I/O") interface 1102. CPU 1104 may be any type of microprocessor. Support circuits (not shown) may include cache, power supplies, clock circuits, data registers, and the like. Memory 1105 may be directly coupled to CPU 1104 or coupled through I/O interface 1102. At least a portion of an operating system may be disposed in memory 1105. Memory 1105 may include one or more of the following: flash memory, random access memory, read only memory, magneto-resistive read/write memory, optical read/write memory, cache memory, magnetic read/write memory, and the like, as well as non-transitory signal-bearing media as described below. In some cases, the memory 1105 may include a program product 1120 having a set of instructions. The instructions, when processed by the programmed computer 1110, causes one or more processes or features described herein to be performed.

I/O interface 1102 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 1102 may be coupled to a conventional keyboard, network, mouse, display printer, and interface circuitry adapted to receive and transmit data, such as data files and the like. Programmed computer 1110 may be coupled to a number of client computers, server computers, or any combination thereof via a conventional network infrastructure, such as a company's Intranet and/or the Internet, for example, allowing distributed use for interface generation.

It should be noted that as used in this specification, the terms "first", "second", "third", etc. do not necessarily refer to the order of things, and may be used to refer to different things. For example, "first processing unit" may refer to processing unit 510a, and "second processing unit" may refer to processing unit 510b. Alternatively, "first processing unit" may refer to processing unit 510c, and "second processing unit" may refer to processing unit 510a, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed is:

1. A system for processing data, comprising:
   a filtering module configured to receive a first data unit including data in a plurality of lanes of a bus, the first data unit including at least a portion of a first packet;
   the filtering module having:
   a sanitizer module configured to:
   receive an input including values in the plurality of lanes, wherein a first lane of the plurality of lanes has a first value indicating whether the first lane includes a beginning of the first packet; and
   provide first data including a second value indicating whether a prescribed number of lanes following the first lane is for the first packet;
   a first processing unit configured to output a first set of two sub-state vectors based at least in part on the first data;
   a merging network configured to provide a first output based at least in part on one or both of the two sub-state vectors; and
   a state accumulator configured to provide a state data based at least in part on the first output provided by the merging network.

2. The system of claim 1, wherein:
   the filtering module further includes a second processing unit configured to output a second set of two sub-state vectors; and
   the merging network is configured to provide a second output based at least in part on one or both of the two sub-state vectors in the second set of two sub-state vectors.

3. The system of claim 1, wherein a value in one of the two sub-state vectors in the first set represents an in-flight state, an in-error state, or both.

4. The system of claim 1, wherein the second value comprises Good_SoP data, which indicates that the prescribed number of lanes following the beginning of the first packet in the first lane include valid packet data for the first packet.

5. The system of claim 1, wherein the first data further comprises Good_EoP data, which indicates that the prescribed number of lanes precedes an end of the first packet in a second lane of the plurality of lanes and include valid packet data for the first packet.

6. The system of claim 1, wherein the first processing unit is configured to provide a first packet continuance data indicating whether the first data unit is for an intermediate portion of a packet.

7. The system of claim 1, wherein for each lane of the plurality of lanes, the first data comprises a start-of-packet (SoP) value and an end-of-packet (EoP) value.

8. A system for processing data, comprising:
   a filtering module configured to receive a first data unit including data in a first plurality of lanes of a bus, the first data unit including at least a portion of a first packet;
   the filtering module including:
   a sanitizer module configured to:
   receive an input having values in the first plurality of lanes of a bus, wherein a first lane of the first plurality of lanes has a first value indicating whether the first lane includes an end of the first packet; and
   provide first data including a second value indicating whether a prescribed number of lanes preceding the first lane is for the first packet;
   a first processing unit configured for:
   generating a first sub-state vector for the first data unit, the first sub-state vector having a first sub-state value for the first lane that is based on whether the first packet begins in the first data unit; and
   generating a second sub-state vector for the first data unit based on the first data, the second sub-state vector having a second sub-state value for the first lane that is based on whether the first packet continues through the first data unit, or begins in a preceding data unit and ends in the first data unit;
   a merging network configured to provide a first output based at least in part on the first sub-state vector, the second sub-state vector, or both; and
   a state accumulator configured to provide a state data based at least in part on the first output provided by the merging network.

9. The system of claim 8, wherein:
the filtering module is also configured to receive a second data unit having data in a second plurality of lanes, the filtering module having a second processing unit;
the second processing unit is configured for generating a third sub-state vector for the second data unit, the third sub-state vector for the second data unit having a third sub-state value for a second lane of the second plurality of lanes for a second packet, wherein the third sub-state value is based on whether the second packet begins in the second data unit;
the second processing unit is also configured for generating a fourth sub-state vector for the second data unit, the fourth sub-state vector for the second data unit having a fourth sub-state value for the second lane that is based on whether the second packet continues through the second data unit, or begins in the first data unit and ends in the second data unit; and
the merging network is configured to provide a second output based at least in part on the third sub-state vector from the second processing unit, the fourth sub-state vector from the second processing unit, or both.

10. The system of claim 8, wherein the first sub-state value in the first sub-state vector represents an in-flight state, an in-error state, or both.

11. The system of claim 8, wherein for each lane of the first plurality of lanes, the first data comprises a start-of-packet (SoP) value and an end-of-packet (EoP) value.

12. The system of claim 8, wherein:
a second lane of the first plurality of lanes has a third value indicating a beginning of the first packet.

13. The system of claim 8, wherein the first processing unit is further configured for generating a packet continuance data that indicates whether the first data unit is for an intermediate portion of the first packet.

14. The system of claim 8, wherein the state accumulator is further configured to transfer the state data obtained in a current processing cycle to a next processing cycle.

15. A method for processing data, comprising:
receiving a first data unit by a filtering module that includes a first processing unit, the first data unit having data in a first plurality of lanes of a bus, the first data unit including at least a portion of a first packet, wherein a first lane has a first value indicating whether the first lane includes an end of the first packet;
providing, by a sanitizer module, first data including a second value indicating whether a prescribed number of lanes preceding the first lane is for the first packet;
generating a first sub-state vector for the first data unit by the first processing unit, the first sub-state vector having a first sub-state value for the first lane that is based on whether the first packet begins in the first data unit;
generating a second sub-state vector for the first data unit by the first processing unit, the second sub-state vector having a second sub-state value for the first lane that is based on whether the first packet continues through the first data unit, or begins in a preceding data unit and ends in the first data unit;
determining a first output by a merging network based at least in part on the first sub-state vector, the second sub-state vector, or both; and
determining a state data for storage at a state accumulator, wherein the state data is based at least in part on the first output provided by the merging network.

16. The method of claim 15, further comprising:
receiving a second data unit by the filtering module, the filtering module having a second processing unit, the second data unit having data in a second plurality of lanes;
generating a third sub-state vector for the second data unit by the second processing unit, the third sub-state vector having a third sub-state value for a second lane of the second plurality of lanes for a second packet, the third sub-state value is based on whether the second packet begins in the second data unit;
generating a fourth sub-state vector for the second data unit by the second processing unit, the fourth sub-state vector for the second data unit having a fourth sub-state value for the second lane that is based on whether the second packet continues through the second data unit, or begins in the first data unit and ends in the second data unit; and
determining a second output by the merging network based at least in part on the first sub-state vector from the second processing unit, the second sub-state vector from the second processing unit, or both.

17. The method of claim 15, wherein the first sub-state value in the first sub-state vector represents an in-flight state, or an in-error state, or both.

18. The method of claim 15, wherein for each lane of the first pluralities of lanes the data in the first data unit comprises a start-of-packet (SoP) value and an end-of-packet (EoP) value.

19. The method of claim 15, further comprising generating a packet continuance data that indicates whether the first packet continues through the first data unit.

20. The method of claim 15, further comprising transferring the state data obtained in a current processing cycle to a next processing cycle.

\* \* \* \* \*